United States Patent
Matsuo

(10) Patent No.: US 10,294,887 B2
(45) Date of Patent: May 21, 2019

(54) PISTON PROVIDING FOR REDUCED HEAT LOSS USING COOLING MEDIA

(71) Applicant: FEDERAL-MOGUL CORPORATION, Southfield, MI (US)

(72) Inventor: Eduardo Matsuo, Ann Arbor, MI (US)

(73) Assignee: Tenneco Inc., Lake Forest, IL (US)

( * ) Notice: Subject to any disclaimer, the term of this patent is extended or adjusted under 35 U.S.C. 154(b) by 238 days.

(21) Appl. No.: 15/352,418

(22) Filed: Nov. 15, 2016

(65) Prior Publication Data
US 2017/0138296 A1    May 18, 2017

Related U.S. Application Data

(60) Provisional application No. 62/280,971, filed on Jan. 20, 2016, provisional application No. 62/256,986, filed on Nov. 18, 2015.

(51) Int. Cl.
*F02F 3/20* (2006.01)
*B05D 5/00* (2006.01)
(Continued)

(52) U.S. Cl.
CPC .................. *F02F 3/20* (2013.01); *B05D 5/00* (2013.01); *B23K 1/0008* (2013.01); *F01P 1/04* (2013.01);
(Continued)

(58) Field of Classification Search
CPC ...... F02F 3/20; F02F 3/22; B05D 5/00; B23K 1/00; F01P 1/04
See application file for complete search history.

(56) References Cited

U.S. PATENT DOCUMENTS

| 1,678,957 A | 7/1928 | Otto |
| 1,719,215 A | 7/1929 | Faroy |

(Continued)

FOREIGN PATENT DOCUMENTS

| DE | 3511835 A1 | 10/1986 |
| DE | 4040611 A1 | 7/1992 |

(Continued)

OTHER PUBLICATIONS

Muchai, J., Kelkar, A., Klett, D., & Sankar, J. (2001). Thermal-Mechanical Effects of Ceramic Thermal Barrier Coatings on Diesel Engine Piston. MRS Proceedings, 697, P8.10. doi:10.1557/PROC-697-P8.10, https://www.cambridge.org/core/services/aop-cambridge-core/content/view/488C7989D13B50102C031B605ABFCE5C/S19464274.*

(Continued)

*Primary Examiner* — Kevin A Lathers
(74) *Attorney, Agent, or Firm* — Robert L. Stearns; Dickinson Wright, PLLC

(57) ABSTRACT

A steel piston achieving increased thermal brake efficiency in an internal combustion engine is provided. The piston includes a crown presenting a combustion surface, an outer side wall depending from the combustion surface, an outer cooling gallery, and an undercrown cooling gallery. The outer cooling gallery extends circumferentially along the outer side wall beneath the combustion surface. According to one embodiment, the outer cooling gallery is sealed and filled with air, argon, helium, xenon, or carbon dioxide as a cooling media. In this embodiment, the undercrown cooling gallery is filled with air as a cooling media and includes an open inlet hole having a diameter being from 2% to 4% of an outer diameter of the piston. Alternatively, the undercrown cooling gallery is filled with air, argon, helium, (Continued)

xenon, or carbon dioxide as a cooling media, and the inlet hole is sealed.

22 Claims, 3 Drawing Sheets

(51) Int. Cl.
| | |
|---|---|
| *B23K 1/00* | (2006.01) |
| *F01P 1/04* | (2006.01) |
| *F02F 3/00* | (2006.01) |
| *F02F 3/10* | (2006.01) |
| *F02F 3/18* | (2006.01) |
| *F02F 3/22* | (2006.01) |
| *B23K 101/00* | (2006.01) |

(52) U.S. Cl.
CPC .............. *F02F 3/0092* (2013.01); *F02F 3/10* (2013.01); *F02F 3/18* (2013.01); *F02F 3/22* (2013.01); *B23K 2101/003* (2018.08); *F02F 2200/00* (2013.01)

(56) References Cited

U.S. PATENT DOCUMENTS

| | | |
|---|---|---|
| 1,878,566 A | 9/1932 | Woolson |
| 2,126,306 A | 8/1938 | Bernard |
| 2,772,933 A | 12/1956 | Nichols |
| 2,840,427 A | 6/1958 | Dolza |
| 3,066,002 A * | 11/1962 | Rudkin, Jr. ............... F02F 3/20 92/176 |
| 3,385,175 A | 5/1968 | Meier et al. |
| 3,516,335 A | 6/1970 | Fangman |
| 3,613,521 A | 10/1971 | Itano |
| 3,709,109 A | 1/1973 | Kloeckner |
| 4,011,797 A | 3/1977 | Cornet |
| 4,018,194 A | 4/1977 | Mitchell |
| 4,067,670 A | 1/1978 | Goloff |
| 4,206,726 A | 6/1980 | Johnson |
| 4,253,430 A | 3/1981 | Garter |
| 4,270,494 A | 6/1981 | Garter |
| 4,300,492 A | 11/1981 | Bart |
| 4,494,501 A | 1/1985 | Ludovico |
| 4,517,930 A | 5/1985 | Nakano |
| 4,532,686 A | 8/1985 | Berchem |
| 4,546,048 A | 10/1985 | Guenther |
| 4,553,472 A | 11/1985 | Munro |
| 4,581,983 A | 4/1986 | Moebus |
| 5,546,896 A | 8/1996 | Zaiser |
| 5,845,611 A | 12/1998 | Schmidt |
| 6,003,479 A | 12/1999 | Evans |
| 6,477,941 B1 | 11/2002 | Zhu |
| 6,491,013 B1 | 12/2002 | Gaiser |
| 6,513,477 B1 | 2/2003 | Gaiser |
| 6,539,910 B1 | 4/2003 | Gaiser |
| 6,651,549 B2 | 11/2003 | Zhu |
| 6,729,291 B1 | 5/2004 | Scharp |
| 6,840,155 B2 | 1/2005 | Ribeiro |
| 7,051,684 B2 | 5/2006 | Bauer |
| 7,484,295 B2 | 2/2009 | Appo |
| 7,654,240 B2 | 2/2010 | Jarrett |
| 7,870,669 B2 | 1/2011 | Ribeiro |
| 8,161,935 B2 | 4/2012 | Bing |
| 8,327,537 B2 | 12/2012 | Ribeiro |
| 8,522,745 B2 | 9/2013 | Doss |
| 8,584,626 B2 | 11/2013 | Jacobi |
| 8,601,996 B2 | 12/2013 | Miller |
| 8,631,736 B2 | 1/2014 | Kortas |
| 8,683,913 B2 | 4/2014 | Sikorsky |
| 8,739,755 B2 | 6/2014 | Stan |
| 8,863,381 B2 | 10/2014 | Kopchick |
| 8,863,647 B2 | 10/2014 | Kopchick |
| 8,925,511 B2 | 1/2015 | Allig |
| 8,955,487 B2 | 2/2015 | Hampton et al. |
| 8,973,484 B2 | 3/2015 | Scharp |
| 8,973,548 B2 | 3/2015 | Andrens |
| 9,127,618 B2 | 9/2015 | Azevedo |
| 9,163,579 B2 | 10/2015 | Aharonov |
| 9,169,800 B2 | 10/2015 | Matsuo |
| 9,291,088 B2 | 3/2016 | Han |
| 2001/0025568 A1 | 10/2001 | Kemnitz |
| 2004/0211314 A1 | 10/2004 | Bousseau |
| 2007/0079775 A1 | 4/2007 | Lin |
| 2007/0113802 A1 | 5/2007 | Mihara |
| 2009/0020007 A1 | 1/2009 | Lin |
| 2011/0073061 A1 * | 3/2011 | Chae ............... F02F 3/0076 123/193.6 |
| 2011/0197845 A1 | 8/2011 | Flowers |
| 2011/0203545 A1 | 8/2011 | Buschkamp |
| 2012/0080004 A1 | 4/2012 | Menezes |
| 2013/0047948 A1 | 2/2013 | Heuschmann |
| 2013/0068096 A1 | 3/2013 | Gabriel |
| 2013/0055969 A1 | 5/2013 | Jacobi |
| 2013/0206084 A1 * | 8/2013 | Azevedo ............... F01P 3/08 123/41.35 |
| 2013/0213218 A1 | 8/2013 | Kaiser |
| 2014/0238232 A1 | 8/2014 | Lapp |
| 2014/0260957 A1 | 9/2014 | Hempston |
| 2015/0047597 A1 | 2/2015 | Volker |
| 2015/0090215 A1 | 4/2015 | Sascha-Oliver |
| 2015/0322886 A1 | 11/2015 | Ulrich |
| 2016/0186686 A1 | 6/2016 | Azevedo |

FOREIGN PATENT DOCUMENTS

| | | |
|---|---|---|
| EP | 0141992 A2 | 5/1985 |
| EP | 189767 A2 | 8/1986 |
| EP | 464626 A1 | 1/1992 |
| EP | 520536 A1 | 12/1992 |
| FR | 965449 A | 9/1950 |
| GB | 1091513 A | 11/1967 |

OTHER PUBLICATIONS

International Search Report, dated Mar. 14, 2017 (PCT/US2016/062129).

* cited by examiner

PISTON PROVIDING FOR REDUCED HEAT LOSS USING COOLING MEDIA

CROSS-REFERENCE TO RELATED APPLICATION

This U.S. utility patent application claims the benefit of U.S. provisional patent application No. 62/256,986, filed Nov. 18, 2015, and U.S. provisional patent application No. 62/280,971, filed Jan. 20, 2016, the entire contents of which are incorporated herein by reference.

BACKGROUND OF THE INVENTION

1. Field of the Invention

This invention relates generally to pistons for internal combustion engines, and methods for manufacturing the pistons.

2. Related Art

Pistons used in internal combustion engines, such as heavy duty diesel pistons, are exposed to extremely high temperatures during operation, especially along the crown of the piston. Therefore, to moderate the temperature, some pistons are designed with an open cooling gallery beneath the crown, and cooling oil is sprayed into the cooling gallery as the piston reciprocates along a cylinder bore of the engine. The oil flows along the inner surface of the crown and dissipates heat away from the crown. However, to control the piston temperature during operation, a high flow of oil must be maintained constantly. In addition, the oil degrades over time due to the high temperature of the internal combustion engine, and the oil must be changed periodically to maintain engine life. Furthermore, when the cooling gallery temperature exceeds 350° C., the oil tends to burn at a higher rate, referred to as oil coking, and adhere to the surface of the gallery.

Another option is to design the piston with a sealed cooling gallery containing cooling oil or another coolant to control the piston temperature. U.S. Pat. No. 9,127,619 discloses an example of a piston including a sealed cooling gallery partially filled with a liquid containing metal particles having a high thermal conductivity. The liquid carries the metal particles throughout the cooling gallery as the piston reciprocates in the internal combustion engine, and the metal particles remove heat away from the crown. The metal particles can re-distribute the heat flow, and thus reduce carbon deposits, coking, and oil degradation along the crown.

It is also desirable to reduce heat loss from the combustion chamber to the piston crown, in order to maintain a high temperature in the combustion chamber and achieve higher engine brake thermal efficiency. Thus, a thermal barrier coating can be applied to the piston crown for additional insulation. However, engine manufacturers continuously strive to develop new and improved methods to better maintain heat in the combustion chamber, reduce the operating temperature of the piston, and thus further improve engine brake thermal efficiency.

SUMMARY OF THE INVENTION

One aspect of the invention comprises a piston for an internal combustion providing the engine with improved brake thermal efficiency (BTE). The piston includes a body formed of a metal material. The body includes a crown presenting a combustion surface. The crown includes an outer side wall depending from the combustion surface, and the outer side wall presents an outer diameter of the body. The crown also includes an outer cooling gallery and an undercrown cooling gallery. The outer cooling gallery extends circumferentially along the outer side wall beneath the combustion surface, the outer cooling gallery is sealed and contains a first cooling media. The undercrown cooling gallery is surrounded by the outer cooling gallery beneath a first undercrown surface, and the undercrown cooling gallery contains a second cooling media. The crown includes a lower wall extending along the undercrown cooling gallery, and the lower wall includes an inlet hole to the undercrown cooling gallery.

Another aspect of the invention provides a method of manufacturing a piston for an internal combustion engine. The method includes providing a body formed of a metal material, the body including a crown presenting a combustion surface, the crown including an outer side wall depending from the combustion surface, the outer side wall presenting an outer diameter of the body, the crown including an outer cooling gallery being sealed and an undercrown cooling gallery, the outer cooling gallery extending circumferentially along the outer side wall beneath the combustion surface, the undercrown cooling gallery being surrounded by the outer cooling gallery beneath a first undercrown surface, the crown including a lower wall extending along the undercrown cooling gallery, and the lower wall including an inlet hole to the undercrown cooling gallery. The method further includes providing a first cooling media in the outer cooling gallery and a second cooling media in the undercrown cooling gallery.

BRIEF DESCRIPTION OF THE DRAWINGS

Other advantages of the present invention will be readily appreciated, as the same becomes better understood by reference to the following detailed description when considered in connection with the accompanying drawing wherein.

DESCRIPTION OF THE EXAMPLE EMBODIMENTS

Figure 1:
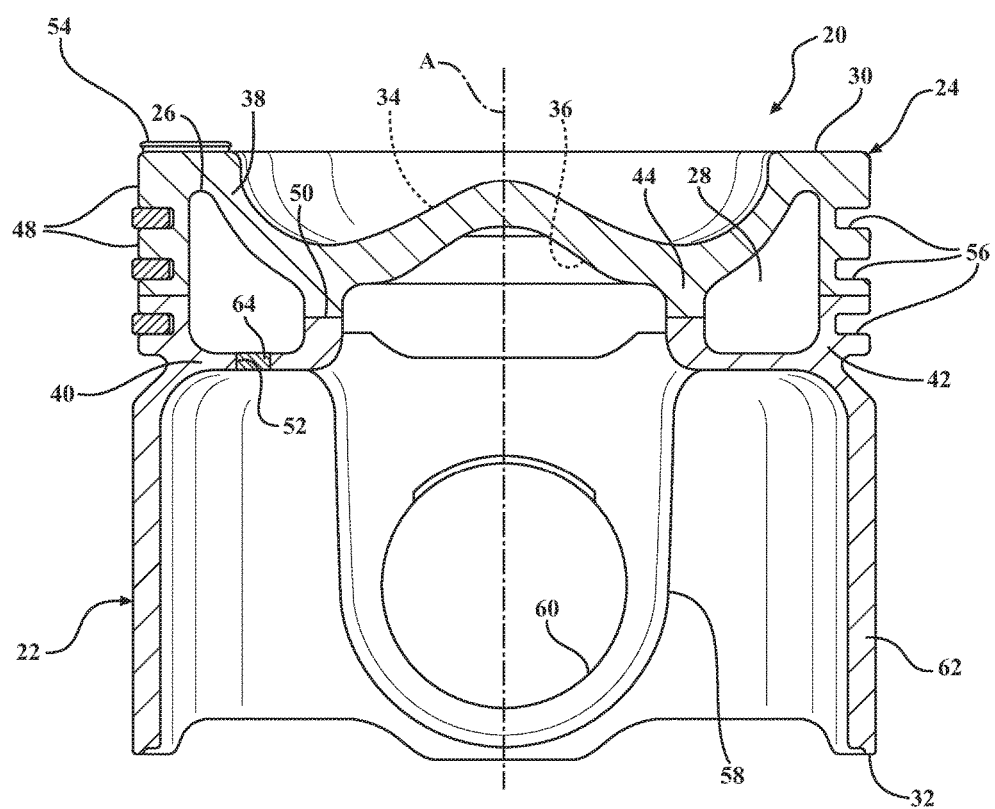
FIG. 1 is a side cross-sectional view of a piston according to one example embodiment with a sealed outer cooling gallery extending circumferentially around the piston and containing a first cooling media.
Figure 2:
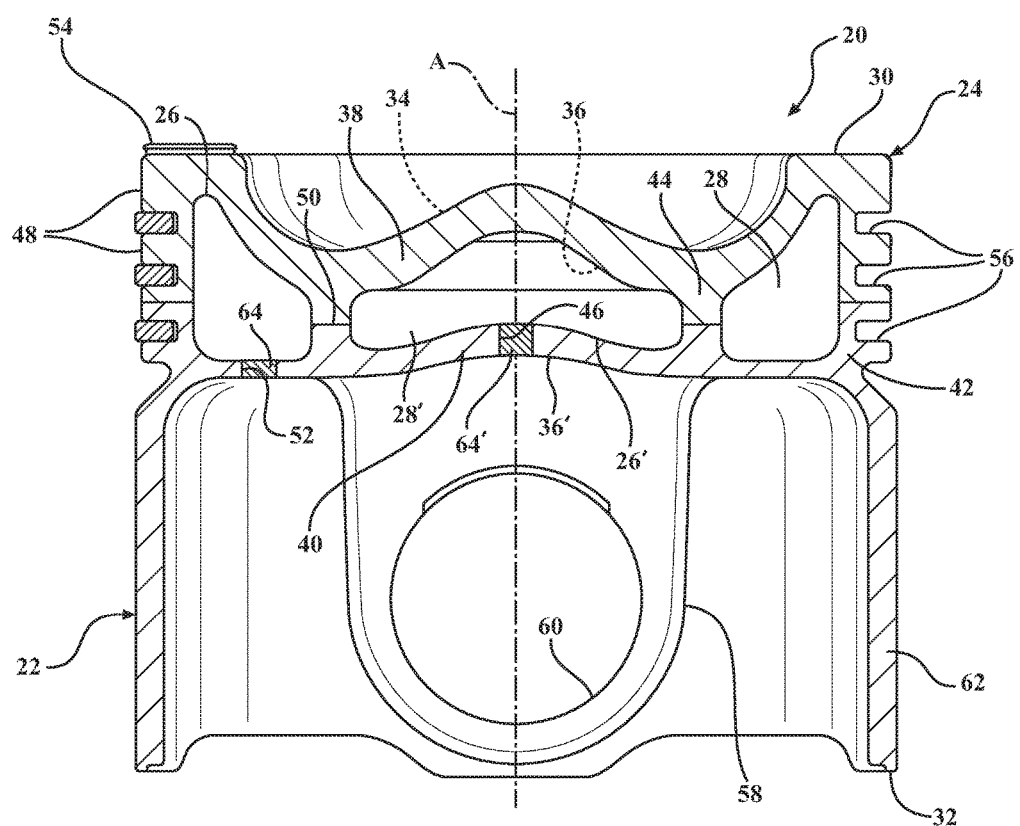
FIG. 2 is a side cross-sectional view of a piston according to another example embodiment which includes a sealed undercrown cooling gallery filled with a second cooling media in addition to the sealed outer cooling gallery.
Figure 3:
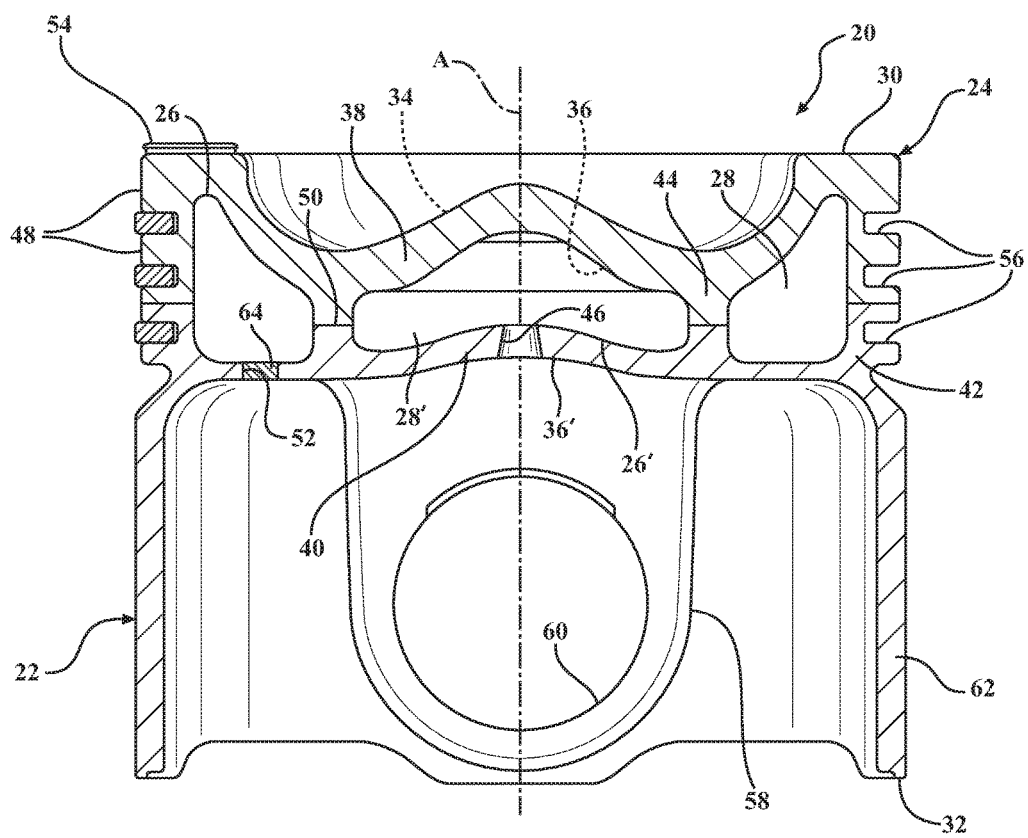
FIG. 3 is a side cross-sectional view of a piston according to yet another example embodiment which includes the sealed outer cooling gallery and the undercrown cooling gallery, wherein the undercrown cooling gallery includes an open inlet hole and contains the second cooling media.

A piston 20 for an internal combustion engine according to example embodiments is generally shown in FIGS. 1-3. The piston 20 includes a sealed outer cooling gallery 26 containing a first cooling media 28 and/or an undercrown cooling gallery 26' containing a second cooling media 28' to reduce heat loss from the combustion chamber through the piston 20, and thus improve brake thermal efficiency (BTE) when the piston 20 is used in an internal combustion engine. Brake thermal efficiency is known to those of ordinary skill in the art as brake power of the engine divided by thermal power of the engine. The brake thermal efficiency is typically used to determine how well the engine converts heat from fuel to mechanical energy.

As shown in the Figures, the piston 20 comprises a body 22 formed of a metal material, such as steel, extending circumferentially around a center axis A and longitudinally along the center axis A from an upper end 30 to a lower end 32. The body 22 includes a crown 24 presenting a combustion surface 34 which is exposed to a combustion chamber during use in the internal combustion engine. The crown 24 also presents a first undercrown surface 36 facing opposite the combustion surface 34.

The crown 24 includes the outer cooling gallery 26 extending along at least a portion of the crown 24. The crown 24 includes an upper wall 38, a lower wall 40, an outer side wall 42, and an inner side wall 44 which together define the outer cooling gallery 26. This outer cooling gallery 26 is disposed along an outer portion of the first undercrown surface 36 and extends circumferentially around the center axis A. The outer cooling gallery 26 is disposed along only a portion of the upper wall 38 of the crown 24 and is spaced radially from the center axis A. The outer side wall 42 and inner side wall 44 are formed by ribs which are joined together to define the outer cooling gallery 26. In this embodiment, the outer ribs are connected by welds 50 to form the outer side wall 42, and the inner ribs are connected by welds 50 to form the inner side wall 44. The ribs could alternatively be attached to one another using another joining method, such as bonding weld or a mechanical attachment. At least one of the walls 38, 40, 42, 44, and typically the lower wall 40, includes an opening 52 for allowing the first cooling media 28 to enter the outer cooling gallery 26. The opening 52 to the outer cooling gallery 26 is then sealed, for example by a plug 64, as shown in the Figures. Alternatively, the opening 52 could be sealed by disposing an adhesive in the opening 52, welding a material to the opening 52, or brazing the opening 52. Alternatively, the piston 20 could be cast as a single piece including the sealed outer cooling gallery 26.

According to another example embodiment, as shown in FIGS. 2 and 3, the piston 20 includes the undercrown cooling gallery 26' along the first undercrown surface 36 at the center axis A of the piston 20. This undercrown cooling gallery 26' is only disposed along a portion of the upper wall 38 of the crown 24 and is surrounded by the circumferential outer cooling gallery 26. The upper wall 38, lower wall 40, and inner side wall 44 together define the undercrown cooling gallery 26'. In this embodiment, the lower wall 40 includes a second undercrown surface 36' facing opposite the combustion surface 34. The undercrown cooling gallery 26' is preferably used in combination with the circumferential outer cooling gallery 26, but can be used independent of the circumferential outer cooling gallery 26. The undercrown cooling gallery 26' is also at least partially filled with a second cooling media 28' to further reduce heat flow through the piston 20 and/or to reduce oil degradation. The second cooling media 28' used in the undercrown cooling gallery 26' can be the same or different from the first cooling media 28 used in the outer cooling gallery 26.

In the embodiment of FIG. 2, the undercrown cooling gallery 26' is sealed to contain the second cooling media 28' and so that no other substance can enter or exit the cooling gallery 26'. According to another embodiment, as shown in FIG. 3, the undercrown cooling gallery 26' is not sealed. A small open inlet hole 46 is located in the lower wall 40 along the center axis A of the piston 20 to allow air to enter the undercrown cooling gallery 26'. The inlet hole 46 may also allow a small amount of oil from the crankcase in the form of a splash or mist to enter the undercrown cooling gallery 26'. In the embodiment of FIG. 2, however, the inlet hole 46 to the undercrown cooling gallery 26' is sealed with a plug 64'. The diameter of the inlet hole 46 is 1% to 25% of the outer diameter of the piston 20. Typically, the diameter of the inlet hole 46 is less than 4% of the outer diameter of the piston 20, or from 2% to 4% of the outer diameter of the piston 20. The outer diameter of the piston 20 is defined as the largest outer diameter along the skirt sections 62 in the thrust direction. Typically, the outer diameter of the piston 20 is measured where the piston 20 to liner clearance is defined. For example, the diameter of the inlet hole 46 could be approximately 5 mm or less. Optionally, the inlet hole 46 can be tapered, such that the diameter of the inlet hole 46 increases moving from the inside of the undercrown cooling gallery 46 to the outside, and away from the combustion surface 34. The tapered hole 46 may facilitate the process of oil entering into the undercrown cooling gallery 26' and/or keep the second cooling media 28' inside the undercrown cooling gallery 26'. A revered tapered hole 46, wherein the diameter of the inlet hole 46 decreases moving from the inside of the undercrown cooling gallery 46 to the outside, and away from the combustion surface 34, can also be used to facilitate the manufacturing process of drilling from the side of the undercrown cooling gallery 26'

In the piston 20 of the example embodiment, the combustion surface 34 of the body 22 presents an apex at the center axis A, a bowl-shape surrounding the apex, and a bowl rim surrounding the bowl-shape. The outer side wall 42 also includes a plurality of ring grooves 56 facing away from the center axis A and extending circumferentially around the center axis A. The ring grooves 56 are spaced from one another by lands 48, and the lands 48 present the outer diameter of the body 22. The piston 20 of the example embodiment further includes at least one pin boss 58, but typically a pair of pin bosses 58, each depending from the crown 24 and extending circumferentially about the center axis A. The at least one pin boss 58 presents a pin bore 60 extending perpendicular to the center axis A for receiving a wrist pin (not shown). The body 22 also includes at least one skirt section 62, but typically a pair of skirt sections 62, depending from the crown 24 and extending circumferentially about the center axis A. The at least one skirt section 62 is joined to the at least one pin boss 58. Typically, the skirt sections 62 are spaced from one another circumferentially about the center axis A by the pin bosses 58. It is noted that the body 22 of the piston 20 could comprise various other designs other than the design disclosed in FIGS. 1 and 2, while still including the outer cooling gallery 26 and/or the undercrown cooling gallery 26' for containing the cooling media 28 and/or 28'.

The first cooling media 28 located in the outer cooling gallery 26 and/or the second cooling media 28' located in the undercrown cooling gallery 26' can be in the form of a gas, liquid, solid, and/or a mixture. Typically, when the cooling media 28 or 28' is in the form of a gas, the gas fills 100 volume percent (vol. %) of the cooling gallery 26, 26'. Various different types of gas could be used for the cooling media 28 or 28', for example air, helium, argon, helium, xenon, carbon dioxide, another gas, or even a partial vacuum. The gas cooling media 28 or 28' has a thermal conductivity which is lower than solid materials, multiphase liquid/gas mixtures, and liquids, such as conventional cooling oils. For example, at 25° C., air has a thermal conductivity of about 0.024 W/(m·K), helium has a thermal conductivity of about 0.142 W/(m·K), and argon has a thermal conductivity of about 0.016 W/(m·K). According to one example embodiment, the second cooling media 28' which fills the undercrown cooling gallery 26' is argon, a partial vacuum, or another gas that is more effective at reducing heat flow than air. Either argon, air, or another type of first cooling media 28 then fills the outer cooling gallery 26.

According to another example embodiment, the first cooling media 28 which fills or partially fills the outer cooling gallery 26 and/or the second cooling media 28' which fills or partially fills the undercrown cooling gallery 26' is a liquid, solid, or a mixture of solids and liquids. Examples of compositions which can be used as the cooling media 28 or 28' are disclosed in U.S. Pat. Nos. 9,127,619, 8,955,486, 8,662,026; and U.S. Provisional Patent Application No. 62/262,704. According to one example embodiment, a coolant having the trade name EnviroKool™ is used as the second cooling media 28' which partially fills the undercrown cooling gallery 26'. In this case, air or another type of first cooling media 28 fills or partially fills the outer cooling gallery 26. According to another example embodiment, the first cooling media 28 consists of air and fills 100% of a volume of the outer cooling gallery 26; and the second cooling media 28' consists of air and fills 100% of a volume of the undercrown cooling gallery 26'.

According to yet another embodiment, standard engine oil is the first cooling media 28 which partially fills the outer cooling gallery 26 and/or the second cooling media 28' which partially fills the undercrown cooling gallery 26'. If only one of the cooling galleries 26, 26' includes the engine oil, then air or another type of cooling media 28, 28' fills or partially fills the other cooling gallery 26, 26'. In the case engine oil is used to partially fill the outer cooling gallery 26 and/or the undercrown cooling gallery 26', the engine oil may create a coked oil layer along the inner surface of the cooling gallery 26, 26' at high surface temperature areas. Thus, the coked oil layer could create additional thermal insulation and further reduce loss through the piston 20.

The low thermal conductivity of the cooling media 28, 28' maintains heat in the combustion chamber and reduces the amount of heat lost through the piston 20. In other words, the low thermal conductivity reduces heat loss from the combustion chamber through the piston 20 and increases the temperature of the combustion chamber. Thus, the cooling media 28, 28' can be referred to as an insulating media or piston thermal management. Additional energy in the combustion chamber can be reclaimed with this waste heat recovery (WHR) system. In addition, oil coking deposits along surfaces of the cooling gallery 26 and the second undercrown surface 36' can be minimized or eliminated. Degradation of cooling oil and lubricating oil which contacts the piston 20 can be reduced. The cooling media 28, 28' can also minimize the temperature of the lower part of the piston 20.

To provide additional insulation, a thermal barrier coating 54 can be applied to the combustion surface 34 of the upper wall 38 of the crown 24, as shown in FIGS. 1, 2, and 3. The thermal barrier coating 54 can also be applied to the first undercrown surface 36 of the piston of FIG. 1 which does not include the undercrown cooling chamber 26'. Alternatively, the thermal barrier coating 54 can be applied to the second undercrown surface 36' of the piston 20 of FIGS. 2 and 3 which includes the undercrown cooling gallery 26'. For example, the piston 20 of FIGS. 2 and 3 can include the thermal barrier coating 54 on both the first undercrown surface 36 and the second undercrown surface 36', or just one of those surfaces. The thermal barrier coating 54 has a thermal conductivity which is lower than the thermal conductivity of the metal used to form the piston body 22. The thermal barrier coating 54 is formed of an insulating material, such as a ceramic based material, for example yttria stabilized zirconia, ceria stabilized zirconia, or another type of partially stabilized zirconia. The thermal barrier coating 54 further reduces heat loss through the piston 20 and increases the combustion chamber temperature.

Another aspect of the invention provides a method of manufacturing the piston 20 including the first cooling media 28 in the outer cooling gallery 26 and/or the second cooling media 28' in the undercrown cooling gallery 26'. The method generally includes the steps of providing the body 22 formed of the steel material; and at least partially filling at least a portion of the outer cooling gallery 26 and/or the undercrown cooling gallery 26' with the cooling media 28, 28'. The method also typically includes sealing the outer cooling gallery 26 and/or the undercrown cooling gallery 26'.

When forming the example piston 20 shown in FIGS. 1-3, the step of providing the body 22 includes joining the upper rib to the lower rib to form the inner side wall 44 and the outer side wall 42 defining the outer cooling gallery 26 therebetween. The joining step can include welding, bonding welding, mechanically attaching, or using another technique to join the ribs.

The step of filling the outer cooling gallery 26 with the first cooling media 28 typically includes forming the opening 52 in one of the walls 38, 40, 42, 44 of the crown 24, typically the lower wall 40, and then pumping the first cooling media 28 through the opening 52. In this embodiment, the opening 52 can be formed before or after the joining step, and the step of filling the cooling gallery 26 occurs after the joining step. Finally, this method includes sealing the opening 52 to the outer cooling gallery 26 with a plug and fixing the plug, for example by welding, brazing, a screw, or an adhesive. U.S. Provisional Patent Application No. 62/110,191, which is incorporated herein by reference, discloses an example method used to seal the cooling gallery 26. Alternatively, the outer cooling gallery 26 can include the opening 52 which can be left unsealed, provided that it will not be aligned with an oil cooling jet. The same steps discussed with regard to the opening 52 can be conducted to fill and seal the inlet hole 46 to the undercrown cooling gallery 26'. Alternatively, the undercrown cooling gallery 26' can include the small hole 46 and can be left unsealed.

According to another embodiment, the piston 20 could be cast as a single piece including the sealed cooling gallery 28, such that air is the first cooling media 28 which fills the sealed outer cooling gallery 28. In other embodiments, a partial vacuum, argon, helium, xenon, carbon dioxide, or another gas having a low thermal conductivity, for example a gas effective in reducing heat flow than air, is disposed in the outer cooling gallery 26 and/or the undercrown cooling gallery 26' before sealing the cooling gallery 26. The process used to manufacture the piston 20 is much simpler, resulting in lower cost, compared to prior methods.

Obviously, many modifications and variations of the present invention are possible in light of the above teachings and may be practiced otherwise than as specifically described while within the scope of the following claims.

The invention claimed is:
1. A piston for an internal combustion engine, comprising:
a body formed of a metal material;
said body including a crown presenting a combustion surface;
said crown including an outer side wall depending from said combustion surface, said outer side wall presenting an outer diameter of said body;

said crown including an outer cooling gallery and an undercrown cooling gallery;

said outer cooling gallery extending circumferentially along said outer side wall beneath said combustion surface, said outer cooling gallery being sealed and containing a first cooling media;

said undercrown cooling gallery being surrounded by said outer cooling gallery beneath a first undercrown surface, said undercrown cooling gallery containing a second cooling media; and said crown including a lower wall extending along said undercrown cooling gallery, said lower wall including an inlet hole to said undercrown cooling gallery, and said inlet hole to said undercrown cooling gallery being tapered.

2. The piston of claim 1, wherein said inlet hole to said undercrown cooling gallery has a diameter being from 1% to 25% of said outer diameter of said body.

3. The piston of claim 1, wherein said inlet hole to said undercrown cooling gallery has a diameter being from 2% to 4% of said outer diameter of said body.

4. The piston of claim 1, wherein said inlet hole to said undercrown cooling gallery is open.

5. The piston of claim 4, wherein a diameter of said inlet hole increases or decreases in a direction moving away from said combustion surface.

6. The piston of claim 1, wherein said inlet hole to said undercrown cooling gallery is sealed.

7. The piston of claim 1, wherein each of said first cooling media and said second cooling media are selected from the group consisting of a solid, a liquid, a gas, air, and a partial vacuum.

8. The piston of claim 7, wherein said outer cooling gallery is sealed, said first cooling media is at least one of a solid, a liquid, a gas, and air; and said inlet hole to said undercrown cooling gallery is open, and said second cooling media is air.

9. The piston of claim 7, wherein said outer cooling gallery is sealed, said first cooling media consists of a solid, a liquid, a gas, air, and a partial vacuum; said inlet hole to said undercrown cooling gallery is open, said second cooling media consists of air, and the air fills 100% of a volume of said undercrown cooling gallery.

10. The piston of claim 1 further including a thermal barrier coating applied to at least one of said combustion surface, said first undercrown surface, and a second undercrown surface located beneath said undercrown cooling gallery; and said thermal barrier coating has a thermal conductivity being lower than a thermal conductivity of said metal material of said body.

11. The piston of claim 10, wherein said thermal barrier coating is formed of an insulating material.

12. The piston of claim 1, wherein said body is formed of steel and extends circumferentially around a center axis and longitudinally from an upper end to a lower end;

said crown includes an upper wall presenting said combustion surface and an inner side wall;

said upper wall, said lower wall, said outer side wall, and said inner side wall together define said outer cooling gallery;

said outer cooling gallery is spaced radially from said center axis;

said outer side wall and said inner side wall are formed by ribs joined together;

at least one of said outer side wall, said inner side wall, and said lower wall includes an opening for allowing cooling media to enter said outer cooling gallery, and said opening is sealed;

said lower wall presents a second undercrown surface beneath said undercrown cooling gallery;

said combustion surface presents an apex at said center axis, a bowl-shape surrounding said apex, and a bowl rim surrounding said bowl-shape;

said outer side wall includes a plurality of ring groves facing away from said center axis and extending circumferentially around said center axis, said ring grooves being spaced from one another by lands, and said lands presenting said outer diameter of said body;

said body includes a pair of pin bosses each depending from said crown, each of said pin bosses presenting a pin bore extending perpendicular to said center axis;

said body includes a pair of skirt sections depending from said crown and spaced from one another by said pin bosses;

said first cooling media fills 100% of a volume of said outer cooling gallery, and said first cooling media consists of air;

said upper wall, said lower wall, and said inner side wall together define said undercrown cooling gallery;

said undercrown cooling gallery is disposed at said center axis and extends radially outwardly to said outer cooling gallery;

said second cooling media fills 100% of a volume of said undercrown cooling gallery, and said second cooling media consists of air;

said inlet hole to said undercrown cooling gallery has a diameter being from 2% to 4% of a largest outer diameter of said body along said skirt sections;

and further including:

a thermal barrier coating applied to at least one of said combustion surface, said first undercrown surface, and said second undercrown surface; and wherein said thermal barrier coating is formed of an insulating material, said insulating material including a partially stabilized zirconia.

13. A method of manufacturing a piston for an internal combustion engine, comprising the steps:

providing a body formed of a metal material, the body including a crown presenting a combustion surface, the crown including an outer side wall depending from the combustion surface, the outer side wall presenting an outer diameter of the body, the crown including an outer cooling gallery being sealed and an undercrown cooling gallery, the outer cooling gallery extending circumferentially along the outer side wall beneath the combustion surface, the undercrown cooling gallery being surrounded by the outer cooling gallery beneath a first undercrown surface, the crown including a lower wall extending along the undercrown cooling gallery, the lower wall including an inlet hole to the undercrown cooling gallery being tapered; and providing a first cooling media in the outer cooling gallery and a second cooling media in the undercrown cooling gallery.

14. The method of claim 13, wherein the first cooling media consists of air, the step of providing the first cooling media in the outer cooling gallery includes filling the outer cooling gallery with the air, and further including sealing the outer cooling gallery.

15. The method of claim 13, wherein the step of providing the first cooling media in the outer cooling gallery includes filling the outer cooling gallery with at least one of argon, helium, xenon, and carbon dioxide.

16. The method of claim 13, wherein the first cooling media includes a multiphase mixture of liquid and gas, and the step of providing the first cooling media in the outer cooling gallery includes disposing a liquid in the outer cooling gallery, and further including sealing the outer cooling gallery.

17. The method of claim 13, wherein the second cooling media consists of air, and the step of providing the second cooling media in the undercrown cooling gallery includes filling the undercrown cooling gallery with the air.

18. The method of claim 13, wherein the inlet hole to the undercrown cooling gallery is open, and the inlet hole has a diameter being from 2% to 4% of the outer diameter of the body.

19. The method of claim 13 including applying a thermal barrier coating to at least one of the combustion surface, the first undercrown surface, and a second undercrown surface located beneath the undercrown cooling gallery; and the thermal barrier coating has a thermal conductivity being lower than a thermal conductivity of the metal material of the body.

20. The method of claim 13 including sealing the inlet hole to the undercrown cooling gallery.

21. The method of claim 20, wherein the sealing step includes at least one of the following steps: disposing a plug in the inlet hole, disposing an adhesive in the inlet hole, welding a material to the inlet hole, and brazing the inlet hole.

22. The method of claim 13, wherein the step of providing the body includes forming the outer cooling gallery and the inner cooling gallery by joining an upper rib extending circumferentially around a center axis to a lower rib extending circumferentially around the center axis.

* * * * *